United States Patent [19]
Son

[11] Patent Number: 5,829,040
[45] Date of Patent: Oct. 27, 1998

[54] SNOOPER CIRCUIT OF A MULTI-PROCESSOR SYSTEM

[75] Inventor: Min-hee Son, Seoul, Rep. of Korea

[73] Assignee: Samsung Electronics Co., Ltd., Suwon, Rep. of Korea

[21] Appl. No.: 839,346

[22] Filed: Apr. 18, 1997

Related U.S. Application Data

[63] Continuation of Ser. No. 361,484, Dec. 22, 1994, abandoned.

[30] Foreign Application Priority Data

Apr. 11, 1994 [KR] Rep. of Korea .......... 94-7531

[51] Int. Cl.$^6$ .................................................. G06F 13/00
[52] U.S. Cl. ............................................. 711/146
[58] Field of Search ................. 395/468, 470, 395/472, 473; 711/141, 143, 145, 146

[56] References Cited

U.S. PATENT DOCUMENTS

| | | | |
|---|---|---|---|
| 4,928,225 | 5/1990 | McCarthy et al. | 395/472 |
| 4,959,777 | 9/1990 | Holman, Jr. | 395/468 |
| 5,119,485 | 6/1992 | Ledbetter, Jr. et al. | 395/473 |
| 5,274,787 | 12/1993 | Hirano et al. | 395/470 |
| 5,335,335 | 8/1994 | Jackson et al. | 395/448 |
| 5,355,467 | 10/1994 | MacWilliams et al. | 395/473 |
| 5,455,925 | 10/1995 | Kitahara et al. | 395/449 |
| 5,522,058 | 5/1996 | Iwasa et al. | 395/472 |

FOREIGN PATENT DOCUMENTS

| | | |
|---|---|---|
| 92-9441 | 10/1992 | Rep. of Korea . |
| 92-9442 | 10/1992 | Rep. of Korea . |
| 93-7050 | 7/1993 | Rep. of Korea . |

OTHER PUBLICATIONS

MC68040 32 Bit Third–Generation Microprocessor: MC68040 User's Manual, Section 7 (pp. 7–1 to 7–19), Section 8 (pp. 8–1, 8–47 to 8–58) 1989.

Archibald, James and Jean–Loup Baer. "Cache Coherence Protocols: Evaluation Using a Multiprocessor Simulation Model", ACM Transactions on Computer Systems, vol. 4, No. 4, pp. 273–298. Nov. 1986.

Papamarcos, Mark S. and Janek H. Patel. "A Low Overhead Coherence Solution for Multiprocessors with Private Cache Memories", The Cache Coherence Problem in Shared–Memory Multiprocessors: Hardware Solutions, p. 173–179. 1993.

*Primary Examiner*—Tod R. Swann
*Assistant Examiner*—Conley B. King, Jr.
*Attorney, Agent, or Firm*—Rothwell, Figg, Ernst & Kurz

[57] ABSTRACT

A snooper circuit of a multi-processor system includes a plurality of processor boards each having a central processing unit, a cache memory, a cache controller to control the cache memory and a snooper controller, a main memory, and a system bus for interconnecting these. The snooper circuit comprises an address tag memory, a state tag memory, a first comparator, a second comparator and the snooper controller for judging the address match between the other requester and the snooper controller by receiving the output of the first comparator, judging whether bus operation for the same address is doubly requested before the bus operation is finished by receiving the output of the second comparator, offering output predetermined cache coherency signal on the system bus according to the judged result and the address match signal between the other requester and the cache memory, and offering output first control signal for writeback, second control signal for updating state, third control signal for controlling a data buffer and fourth control signal for retrying of the CPU and referring or updating the data of the state tag memory, and maintains the cache coherency between the main memory and the cache memories.

4 Claims, 3 Drawing Sheets

SNOOPER CIRCUIT OF A MULTI-PROCESSOR SYSTEM

This is a continuation of application Ser. No. 08/361,484, filed Dec, 22, 1994, now abandoned.

BACKGROUND OF THE INVENTION

This invention relates to a snooper circuit to maintain data coherency between cache memory and main memory in a multi-processor system, and more particularly, to a snooper LO circuit embodied by a high speed device of an electrically programmable logic device (EPLD) according to a modified Illinois protocol.

Generally, a computer system uses a hierarchically structured memory to promote system performance. Cache memory, main memory (RAM), hard disk (and floppy disk) and magnetic tape, which constitute the hierarchically structured memory, are established in accordance with the frequency of use of the data by the CPU. Here, the memory device having the highest frequency of use (typically situated nearest the CPU) has a higher processing speed, such as in the case of cache memory or main memory, but the cost per unit of memory capacity is also higher. Similarly, though the memory devices having a lower frequency of use (farther from the CPU) are generally slower, they enjoy a relatively large memory capacity such as the case of magnetic tape.

Accordingly, for effective memory use in view of speed as well as cost, most computer systems adopt a cache memory.

However, when the system uses a cache memory, data coherency has to be maintained.

A multi-processor system especially adopts a snooper circuit to maintain data coherency between cache memories and main memories. Synapse protocol, Berkeley protocol, Illinois protocol and firefly & dragon protocol are known as prior art methods for the maintenance of data coherency when a cache memory is used. These protocols are described in an article by J. Archibald and J. L. Baer entitled "Cache Coherence Protocols: Evaluation Using a Multiprocessor Simulation Model" (*ACM Transactions on Computer Systems*, 1986). The synapse protocol is concerned with a method for determining whether data should be supplied to a main memory upon a caching miss with 1-bit data for tagging which is related to a cache data block in the main memory. Berkeley protocol relates to a method for directly transmitting data between cache memories, and controlling a plurality of cache memories to commonly store data blocks whose contents are different from those of the main memory. Illinois protocol is concerned with a method for determining, when data is read into one cache memory, whether the data is commonly stored in another cache memory. Based on the result, Illinois protocol can afford to reduce bus usage by avoiding invalidation which may occur upon the execution of a write operation, without changing the data stored in cache memory.

Meanwhile, prior art related to the present invention is disclosed in Korean Patent Publication No. 93-7672 (Publication date: Aug. 18, 1993; applicant: Fujitsu) entitled "Data Processing Method and Apparatus for Maintaining Coherence of Data Stored in Main Memory, External Cache Memory and Internal Cache Memory," by Kitahara Takeshi et al. Here, in order to maintain the coherency of the data stored in main memory, external cache memory and internal cache memory, a data processing apparatus connected to the main memory, the external cache memory and external apparatus by system bus is proposed. The proposed data processing apparatus includes an internal cache memory for storing part of the contents of the main memory, and further comprises a block-in unit for fetching block data from the main memory, a bus release unit for releasing the system bus according to a predetermined signal, a block-in break unit for interrupting the fetching operation of the block-in unit, and an information unit for informing the external cache memory of the state of the fetching operation.

The apparatus for maintaining data coherency is very important in determining system performance and reliability. By the way, though each of the above-mentioned invention and prior protocols have their advantages, they do not always provide the best method to all multi-processor systems due to differences in the specifications of the system bus and computer architecture of each multi-processor system.

SUMMARY OF THE INVENTION

Accordingly, it is an object of this invention to provide a snooper circuit in which, while a modified Illinois protocol is used for compatibility with tightly coupled multi-processor (TICOM) computer architecture, even though the size of a system bus is different from the line size of a cache memory in the processor board, the data coherency can be maintained by the snoop operation to supervise the bus operation and the loss of system performance can be minimized by effective inter-mediation.

In order to accomplish the object, there is provided a snooper circuit for use in a multi-processor system including a plurality of processor boards each having a CPU, cache memory and cache controller for controlling the cache memory, which are connected to each other with a local bus, at least one main memory, a system bus connecting the processor board and the main memory, and a snooper circuit located on the processor board, for maintaining data coherency between the main memory and the cache memory, wherein the snooper circuit comprises:

an address tag memory for storing the address of the cache memory of the processor board to which the address tag memory belongs, receiving the address operated by another requester on the system bus, and outputting an address match signal if the received address matches the stored address;

a state tag memory for storing data state of the matched address;

a first comparator for comparing the address driven by the other requester and the address driven by a snooper controller;

a second comparator for latching the address driven by the CPU at the starting time of the CPU's bus operation, and comparing the monitored address on the system bus with the latched address at a predetermined interval; and a snooper controller for determining whether the address driven by the other requester matches the address of the snooper controller with the output of the first comparator, determining, before the completion of the bus operation requested by a specific requester, whether the other requester requests the bus operation for the same address with the output of the second comparator, outputting a predetermined cache coherency signal on the system bus according to the determined result and the address match signal, outputting on the local bus a first control signal for write-back, a second control signal for state update, a third control signal for controlling a data buffer and fourth control signal for retrying of the CPU, and referring or updating the data of the state tag memory.

BRIEF DESCRIPTION OF THE ATTACHED DRAWINGS

The above object and advantages of the present invention will become more apparent by the following detailed description a preferred embodiment thereof with reference to the attached drawings in which.

DETAILED DESCRIPTION OF THE INVENTION

Figure 1:
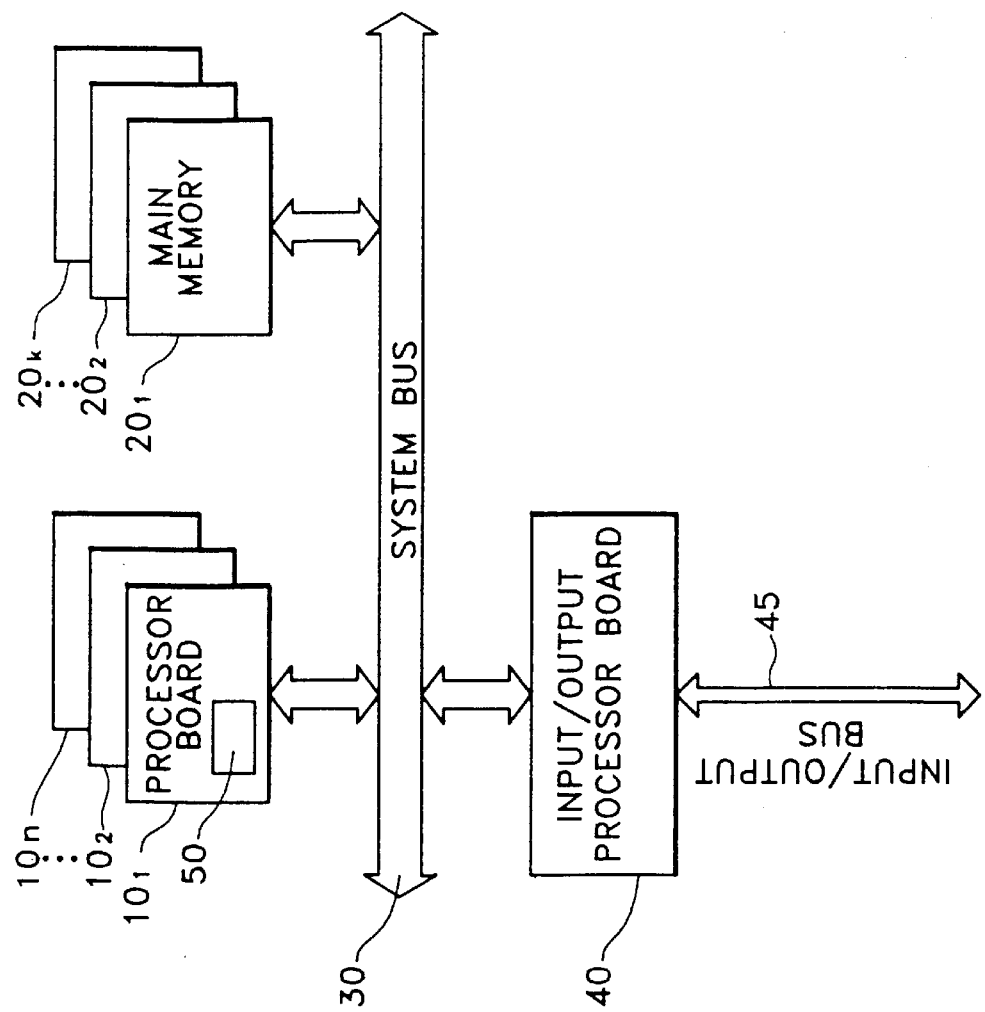
FIG. 1 is a block diagram of a multi-processor system to explain the function of snooper circuit of the present invention.

The snooper circuit of the invention, which is obtained by modifying the Illinois protocol, controls more intelligently the operation of a cache controller and snooper controller without adding a signal line, by using a predetermined coherency signal supplied by system bus of a TICOM computer system. Especially, the snooper controller can be made by using a high speed programmable device (for example, a PLA (Programmable Logic Array) or EPLD device) to prevent system downtime due to a state transfer. FIG. 1 shows a general TICOM computer system architecture to explain the present invention. The computer system (for example, a TICOM system) to which this invention can be applied comprises a plurality of processor boards $10_1$, $10_2, \ldots, 10_n$, main memory 20, input/output processor board 40, system bus 30 for connecting these boards to each other and input/output bus 45 for connecting the input/output processor 40 to an input/output apparatus (not shown). In FIG. 1, the processor boards $10_1, 10_2, \ldots, 10_n$ each include a predetermined size (e.g., 256K bytes) of cache memory and snooper circuit 50 (FIG. 2) for maintaining cache coherency between the cache memories of the other processors and the main memory 20. Also, each of processor boards $10_1$–$10_n$ has a CPU (for example, an MC68040 etc.), controls each function block by an inner local bus and interfaces with the system bus 30. Therefore, in order to access the input/output apparatus, processor boards $10_1$–$10^n$ communicate with the input/output processor board and input/output bus 45 through the system bus 30. The main memory 20 may consist of a plurality of modules $20_1, 20_2, \ldots, 20^k$ to extend memory size as necessary, and the main memory may be shared by all of processor boards $10_1$–$10_n$ and input/output processor 40. Accordingly, the data coherency is needed between the occupied main memory 20 and the cache memory of each processor board. There exist synapse protocol, Berkeley protocol and Illinois protocol as methods for maintaining data coherency as discussed alone. The present invention adopts the Illinois protocol modified for compatibility with the TICOM system. Here, the means (called a "requester"), such as processor boards $10_1$–$10_n$ and input/output processor board 40, may be a "master" and processes data via system bus 30. There are seven kinds of transfer types on the system bus 30: read-for-read (RFR), read-for-write (RFW), normal read (NRD), normal write (NWR), lock read (LCR), lock write (LWR) and write back (WRB). Among these, the types related to cache operation are RFR, RFN and WRB.

Figure 2:
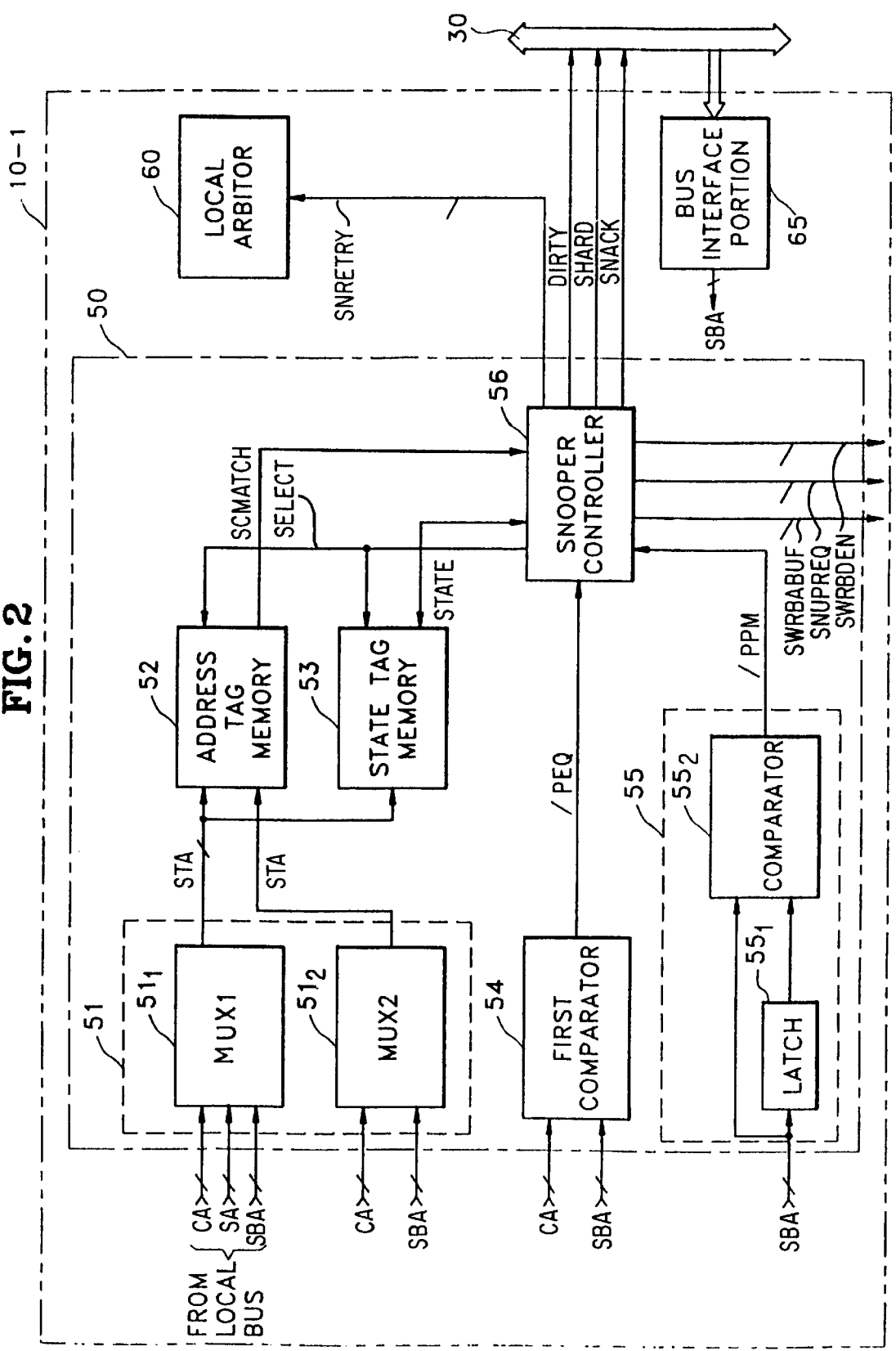
FIG. 2 is a block diagram of a snooper circuit of the present invention.

FIG. 2 shows a block diagram of the snooper circuit 50 of a multi-processor system according to the present invention. The snooper circuit of this invention comprises a multiplexer 51, an address tag memory 52, a state tag memory 53, a first comparator 54, a second comparator 55 and a snooper controller 56. The snooper circuit receives the various signals of system bus 30 obtained through bus interface portion 65 and the information from cache controller (not shown) of the processor board including the snooper circuit itself, to output first through third control signals to the local bus to thereby change the state of the cache memory (not shown) or output a fourth control signal (/SNRETRY) for the CPU's retrying to local arbiter 60. The multiplexer 51 comprises first multiplexer $51_1$ and second multiplexer $51_2$ and outputs a system address SBA. The first multiplexer $51_1$ receives cache address (CA) and CPU address (SA) through the local bus and system address (SBA) through the bus interface portion 65, and outputs a system address SBA. The second multiplexer $51_2$ receives the cache address (CA) and the system address (SBA). If a change in cache address (CA) occurs, the multiplexer 51 receives the changed cache address to be stored in the address tag memory 52. The multiplexer 51 also receives an address, which is driven by another requester through system bus 30, via an address buffer (not shown) and outputs the address to the address tag memory 52. The address tag memory 52 compares the cache address (CA) and the system address (SBA) which is driven by another requester on the system bus 30, and determines whether the address already exists in its own cache memory. The address tag memory 52 consists of a predetermined size (e.g., 16K bytes) of a static random access memory (SRAM) for storing the address of cache memory of the processor board to which the address tag memory 52 belongs, and includes a comparator (not shown). Here, the address tag memory 52 compares the system address on the system bus 30 input from the multiplexer 51 with the stored address on the cache memory, and if the two address match, outputs an address match signal to the snooper controller 56. The state tag memory 53 stores the state of the data corresponding to the matched address in the address tag memory 52. The state tag memory 53 can be embodied by a predetermined size (e.g., 16K bytes) of static random access memory (SRAM). The data exists in four states: SHARED, DIRTY, VALID and INVALID. Two bit is used for differentiating the four states each other. A "SHARED" state indicates that more than two cache memories commonly store the data of the same address and the data is consistent with the data of the main memory 20. A "DIRTY" state indicates that the data of a specific cache memory is not commonly stored in other cache memories but stored only in the specific cache memory, and is not consistent with the data of main memory 20 whose address corresponds to the data of the specific cache memory, due to the change of cache data, by CPU's writing operation. A "VALID" state indicates that the data of a specific cache memory is not commonly stored in other cache memories, but is consistent with the data of main memory 20. An "INVALID" state indicates that it is impossible to use the data. As above, the state tag memory 53 manages the data in four states and changes or supplies the stored state information according to the control of the snooper controller 56. The snooper controller 56 outputs a SELECT signal to control the memories 52 and 53. Memories for tagging can be embodied by a 74ACT2164 chip and can allow high speed processing. The first comparator 54 compares the cache address (CA) with the system address (SBA) operated on the system bus 30 and supplies the output signal (/PEQ) to the snooper controller 56. These addresses are changed according to each bus cycle or the CPU's clock. The signal /PEQ is used for determining whether the CPU (or the cache controller) and the snooper controller 56 have accessed the same cache line at the same time. The collision upon accessing the same cache line as above is generated when the cache controller and the snooper controller 56 recognize the same cache state and start the operation. If independent operation of the two controllers is permitted, the state of cache memory may be transferred to a different state, which should be considered. When the state of the cache memory is valid, let us suppose that the CPU requests a write operation and the snooper controller 56 requests invalidation. At first, the cache controller and the snooper controller 56 refer to the state of cache memory at the same time and then operate after confirming the validity of the cache memory, however, when the operation of the two controllers is finished, the state of the cache memory should be changed to DIRTY by the cache controller while the state of the cache memory should be changed to INVALID by the snooper controller 56. Consequently, as the state transfer occurs in tandem, the cache coherency cannot be maintained. The snooper controller 56 detects the case like above, and executes the following operation to maintain the cache coherency. First, when the CPU initiates operation at first, the snooper controller 56 outputs the SNACK signal and thereby makes the other requestors retry. Second, the snooper controller 56 makes the CPU retry when the SNACK line is not driven due to the CPU's later operation. First comparator 54 can be embodied by a 74F521 chip or the like. The second comparator 55 comprises a latch 55₁ for latching and storing the address operated on the system bus 30 by the CPU, and a comparator 552 for comparing the address on the system bus 30 with the address latched by the latch 55₁ at a predetermined interval. Thus the second comparator 55 supplies the output signal (/PPM) to the snooper controller 56 according to the comparison of the address. The second comparator 55 can be embodied by a D flip-flop (e.g., a 74F521 or 74F377). The output signal (/PPM) of the second comparator 55 is the signal for determining, before the execution of bus operation required by the CPU (or the cache controller) is finished, whether another requester (the CPU or the cache controller) executes a bus operation for the same address. When bus operations occur in tandem as above, the state of the cache memory should be transferred to a different state by a bus operation of the cache controller. This is restricted to the transfer type of RFR or RFW. Namely, since the information generated from the beginning of an operation caused by the cache controller, with referring to the state of cache memory to the change of the state of the cache memory by the end of bus operation is indefinite, the cache controller has to drive the SNACK signal and thereby makes the other requesters retry until the state of the cache memory is changed.

The snooper controller 56 receives a detected bus information (e.g., address, transfer type), the information supplied by the cache controller and the information from the state tag memory 53 and the address tag memory 52.

1) State updating

The snooper controller 56 detects the transfer type (TT) on the system bus 30, receives the driving signal in the event of the CPU and snooper controller 56 accessing the same cache line from the address tag memory 52 and the state signal (STATE) from the state tag memory 53, and generates a first control signal (/SWRBABUF) for writing-back or a second control signal (/SNUPREQ) for updating state. The signals are outputted onto the local bus. The state is updated according to the following table 1.

TABLE 1

| current state | transfer type on bus | new state |
| --- | --- | --- |
| SHARED | RFR | SHARED |
|  | RFW | INVALID |
| DIRTY | RFR | SHARED after write-back |

TABLE 1-continued

| current state | transfer type on bus | new state |
| --- | --- | --- |
|  | RFW | INVALID after write-back |
| VALID | RFR | SHARED |
|  | RFW | INVALID |
| INVALID | RFR | INVALID |
|  | RFW | INVALID |

In the above table 1, when current state is SHARED, if the bus transfer type is RFR then SHARED state is maintained and if the transfer type is RFW then the current state is updated with INVALID. When the current state is dirty, if the bus transfer type is RFR then the current state is updated with SHARED after executing write-back and if RFW then the current state is updated with INVALID after write-back. Also, when the current state is VALID, if the transfer type is RFR then the current state is updated with SHARED, and if the transfer type is RFW then the current state is updated with INVALID.

2) Write-back function for the data of a DIRTY state

Figure 3:
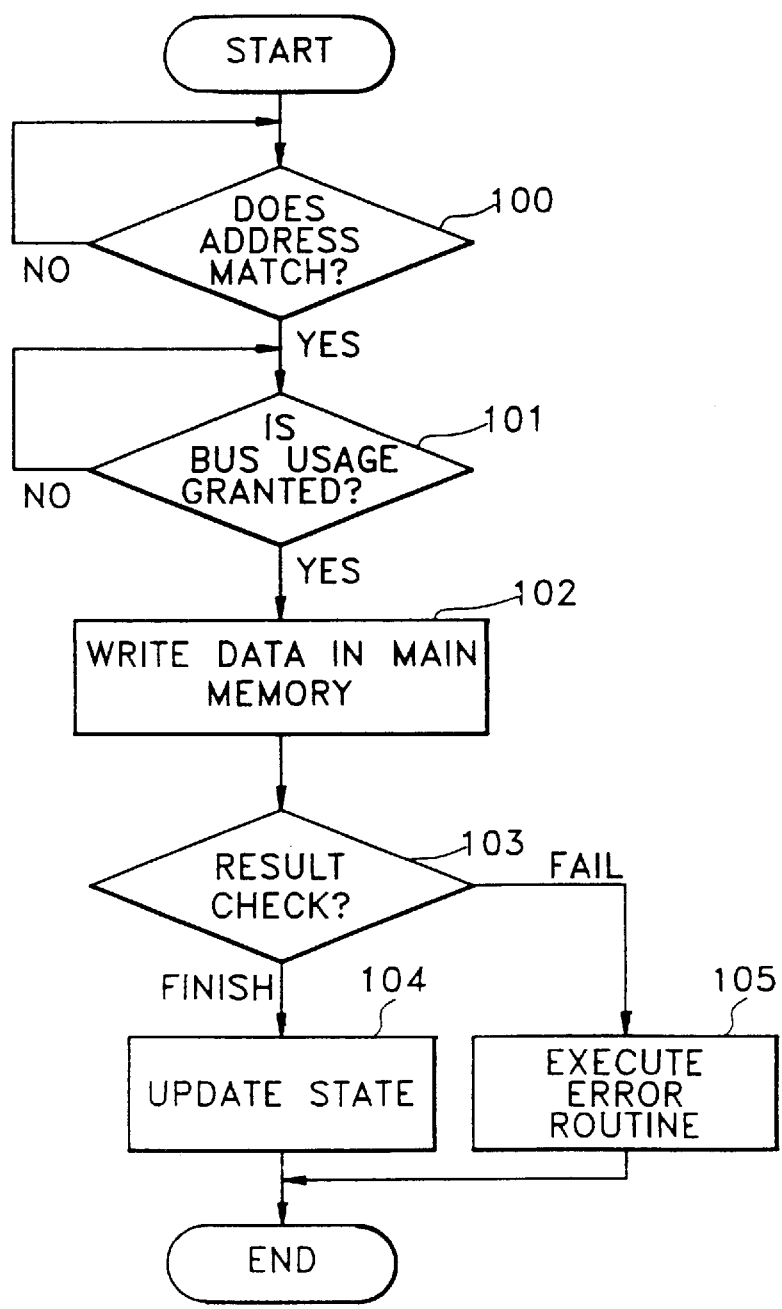
FIG. 3 is a flowchart of a write-back process executed by the snooper circuit shown in FIG. 2.

When other requesters request the data which is situated in the DIRTY state in the cache memory, the write-back function is performed and a state update is required. For this, the snooper controller 56 generates the second control signal (/SNUPREQ) for updating state and a third control signal (/SWRBDEN) for controlling the data buffer. These signals are outputted onto the local bus. The execution order of these write-back operations is shown in FIG. 3. Referring to FIG. 3, it is determined whether the addresses match in the write-back process (100). If matched, it is determined whether the use of the system bus 30 is granted (101). If the use of the system bus 30 is granted, the data is written on the main memory 20 by driving an address buffer (not shown) and a data buffer (not shown) (102), and then the checking of writing operation is performed (103). In the result of the checking, if the writing operation is finished, then the state is updated (104), and if the write operation fails, then an error routine is executed (105).

3) Control function for bus use of another requester

The snooper controller 56 controls the use of the system bus 30 of all requesters that are to access the main memory 20 through the system bus 30, by driving the information for the state of data stored in the cache memory or the operation executed in the processor board to which the snooper controller 56 belongs, on the system bus 30. For this, the snooper controller 56 generates predetermined coherency signals (DIRTY, SHARED, SNACK) on the system bus 30 as following table 2.

TABLE 2

| current state | bus transfer type | driving signal | operation of other requestor |
| --- | --- | --- | --- |
| DIRTY | all | DIRTY | retry |
| SHARED | RFR | SHARED | continue |
| VALID | RFR | SHARED | continue |
| INVALID | — | — | — |

As shown in table 2, if the current state is DIRTY, then the snooper controller 56 makes the other requestors retry by driving the DIRTY signal on the system bus 30, in all the transfer types. When the current state is SHARED or VALID, if the transfer type is RFR, then the snooper controller 56 makes the other requester continue its operation by driving the SHARED signal on the system bus 30.

Meanwhile, there are three cases as follows where the snooper controller 56 makes the other requester retry by driving the SNACK signal on the system bus 30. The first case is where, after one of the processor boards $10_1$–$10_n$ including specific snooper controller 56 outputs a certain address on the system bus 30 in order to execute RFR or RFW, the requirement of the other requester occurs before the operation is finished. The second case is where a state update is needed according to the address driven by the other requester and transfer type. In this case, if the SNACK signal is not driven, there is a danger that the coherency of data may be broken when a request of any other requesters occurs before updating of state. The third case is where the system bus 30 is requested due to the address outputted by the CPU of the processor board being missing from the cache memory. In this case, the SNACK signal is generated when the system address SBA among the addresses detected by the snooper controller 56 matches the cache address CA driven by the CPU (that is, when both the CPU and the snooper controller 56 access the same cache line). If the SNACK signal is not generated, a write-back operation of the snooper circuit 50, for the data whose block is identical but address is not identical, may be performed. Consequently, any other requesters may fetch the wrong data.

4) Function for making CPU retry

The case where the snooper controller 56 make the CPU retry is as follows. First case is where the snooper circuit 50 requests the state update for the same address when data of the address due to the writing operation of the snooper circuit 50 and the corresponding CPU exists validly in the cache memory. Second is the case where bus operation is requested as a miss occurs in the cache memory for the address requested by the CPU, and at the same time, the necessity of a state update for the same address exists in the snooper circuit 50. Third is the case where the snooper circuit 50 requires the state update when the CPU requests a non-cacheable operation to the cache controller. In the second and third cases, it is possible to force the other requestors to retry by generating the SNACK signal but it is greatly advantageous to retry the CPU in the view of performance.

As described above, the present invention guarantees cache coherence between the cache memories located in each processor board and the main memory to promote system reliability, and can raise system performance due to adoption of the modified Illinois protocol and a high-speed device which can afford effective intermediation in bus use. Especially, the present invention can control the operation of the cache controller and snooper controller without adding a signal line, using the SNACK signal supplied from a TICOM bus.

What is claimed is:

1. A snooper circuit for maintaining cache coherency between the main memory and the cache memory in a multi-processor system including a plurality of processor boards each having a CPU, cache memory and cache controller for controlling the cache memory, which are connected to each other with a local bus, at least one main memory, and a system bus connecting the processor board and the main memory, the snooper circuit comprising:

an address tag memory for storing the address of the cache memory of the processor board to which the address tag memory belongs, receiving the address operated on the system bus by an other requester, and outputting an address match signal if the received address matches the stored address;

a state tag memory for storing the data state of the matched address;

a multiplexer for providing tag addresses to both said address tag memory and said state tag memory;

a first comparator for comparing the address driven by the other requester and the address driven by a snooper controller and generating an output indicative of the results of the comparison;

a second comparator for latching the address driven by the CPU at the starting time of the CPU's bus operation, and comparing the monitored address on the system bus with the latched address at a predetermined interval and generating an output indicative of the results of the comparison; and the snooper controller for receiving the output of the first comparator, determining, before finish of the bus operation requested by a specific requester, whether the other requester requests the bus operation for the same address according to the output of the second comparator, outputting a predetermined cache coherency signal on the system bus according to the determined results and the address match signal, outputting on-the local bus a first control signal for write-back, a second control signal for updating state, a third control signal for controlling a data buffer and fourth control signal for retrying of the CPU, and referring or updating the state tag memory.

2. The multi-processor system as claimed in claim 1, wherein the snooper controller outputs a SHARED signal indicating that cache data is commonly stored in the plurality of processor boards, a DIRTY signal indicating that the data of the main memory is not consistent with the data of the cache memory and a SNACK signal for notifying that the current operation of the system bus cannot be executed to the snooper controller of other processor boards.

3. The multi-processor system as claimed in claim 1, wherein the state tag memory uses SHARED, DIRTY, VALID and INVALID data states.

4. A multi-processor system comprising: a plurality of processor boards each having a CPU, cache memory and cache controller for controlling the cache memory, which are connected to each other with a local bus;

at least one main memory;

a system bus connecting the processor board and the main memory; and a snooper circuit located on the processor board, the snooper circuit including:

address tag memory means for storing an address of the cache memory of the processor board to which the address tag memory belongs, receiving the address operated on the system bus by an other requester, and outputting an address match signal if the received address matches the stored address;

a state tag memory for storing data state of the matched address;

a multiplexer for providing tag addresses to both said address tag memory and said state tag memory;

a first comparator means for comparing the address driven by the other requester and the address driven by snooper controller and generating a signal indicative of the results of the comparison;

a second comparator means for latching the address driven by the CPU at the starting time of the CPU's bus operation, and comparing the monitored address on the system bus with the latched address at a predetermined interval and generating a signal indicative of the results of the comparison; and a snooper controller means for determining whether the address driven by the other requester matches the address of the snooper controller according to the signal of the first comparator, determining, before finish of the bus operation requested by a specific requester, whether the other requester requests the bus operation for the same address according to the signal of the second comparator, outputting a predetermined cache coherency signal on the system bus according to the determined results and the address match signal, outputting on the local bus a first control signal for write-back, a second control signal for updating state, a third control signal for controlling a data buffer and fourth control signal for retrying of the CPU, and referring or updating the state tag memory.

* * * * *